July 31, 1934.  A. E. LOBECK  1,968,461
ASTRONOMICAL INSTRUMENT
Filed Feb. 10, 1933   2 Sheets-Sheet 2
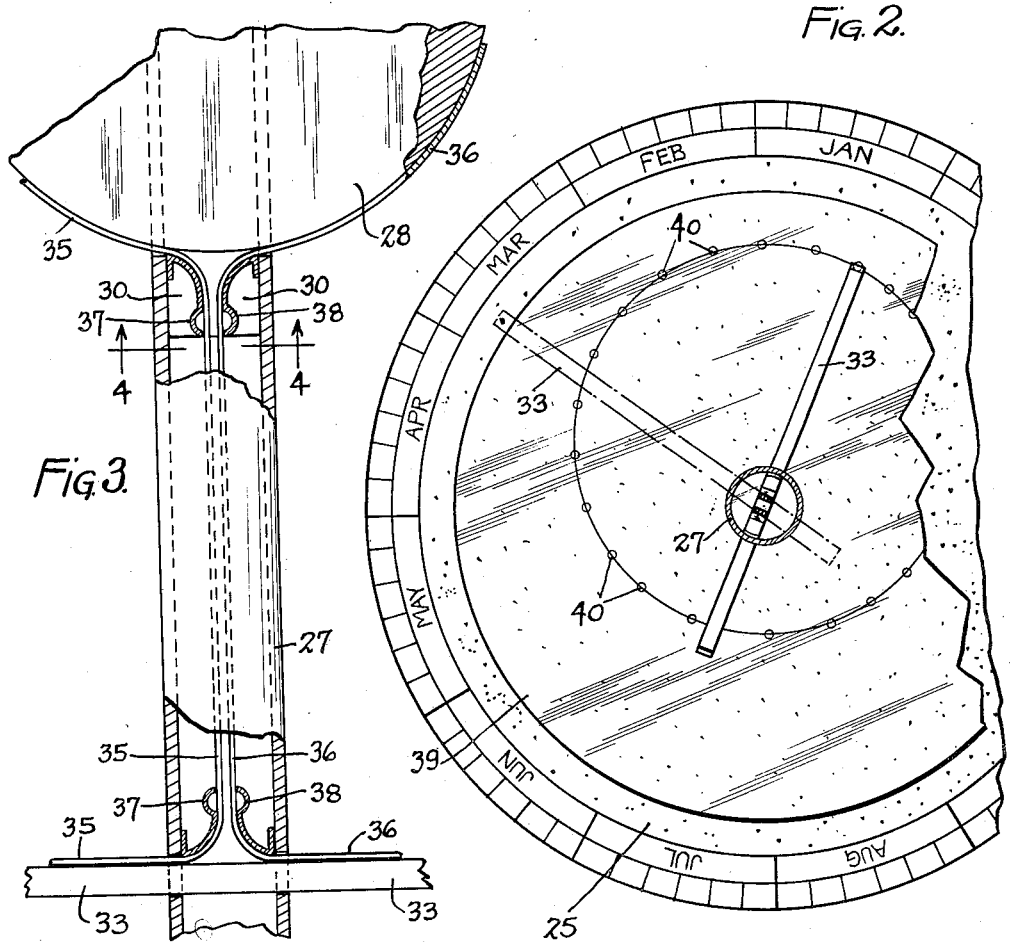
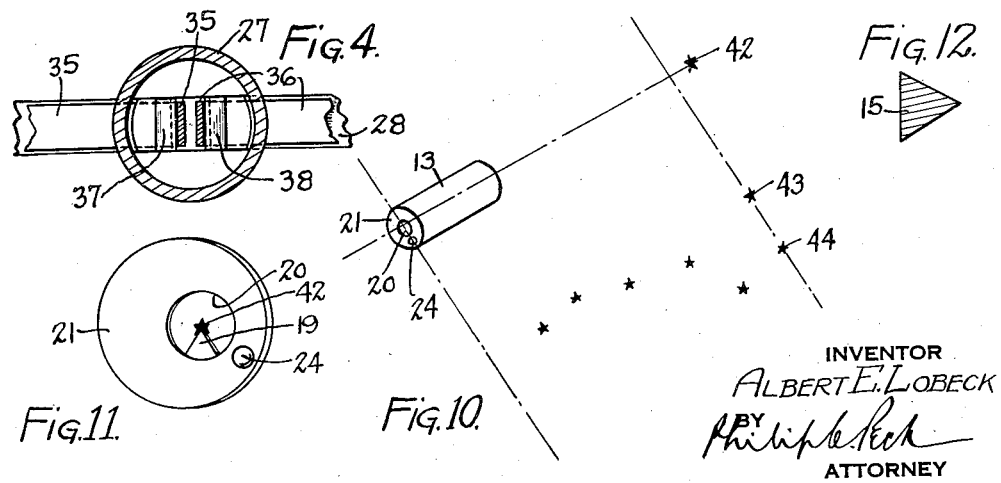
INVENTOR
ALBERT E. LOBECK
BY
ATTORNEY Patented July 31, 1934

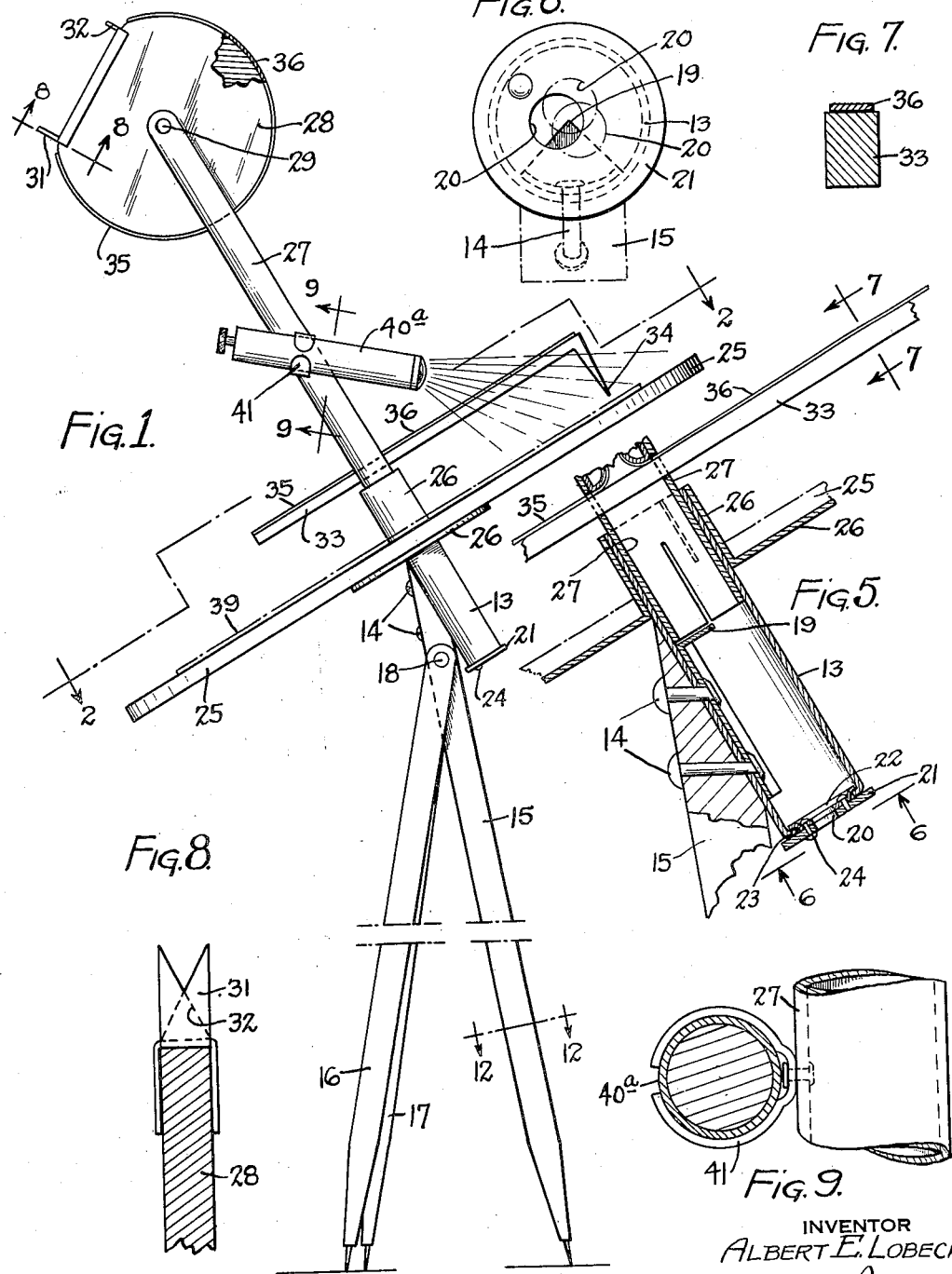

1,968,461

UNITED STATES PATENT OFFICE 1,968,461

ASTRONOMICAL INSTRUMENT

Albert E. Lebeck, Haworth, N. J.

Application February 10, 1933, Serial No. 656,120

19 Claims. (Cl. 35—3)

My invention relates to certain improved astronomical instruments or appliances that may be used for educational and scientific purposes, and more particularly relates to a simplified and inexpensive yet comprehensive device whereby the more characteristic celestial bodies such as individual stars, planets, constellations or other celestial objects may be readily and accurately located even by an unskilled person.

The objects of my invention are, among other things, to provide an improved instrument of this character which is capable of universal use in automatically determining the position of celestial objects and in identifying same in all latitudes and in both hemispheres.

A further object of my invention is to provide a novel and improved instrument adapted to be operated in conjunction with a rotatable star map so as to locate any particular celestial object in the sky by a movable indicator that automatically points from the celestial object shown on the map to the corresponding star or planet in the sky, or vice versa. In short my invention provides a convenient and simplified device for identifying celestial bodies in the sky by automatically indicating through a pointer upon a suitable sky map such star or planet or its position in the sky by right ascension and declination, upon which my improved instrument is trained.

My invention may be best understood from the accompanying drawings and the following description, though the invention is not to be restricted to such drawings, for many changes and modifications may be made without departing from the salient features as hereinafter set forth in the claims.

Referring to the drawings, Fig. 1 is a side elevation of a preferred form of my improved astronomical instrument mounted upon its tripod (in this case of special design);

Fig. 2 is an enlarged plan view of the star maps and associated devices taken on the line 2—2 of Fig. 1;

Fig. 3 is an enlarged side view, partly in vertical section, of the tubular column supporting the rotary sight disk and associated mechanism;

Fig. 4 is a detail section taken on the line 4—4 of Fig. 3;

Fig. 5 is a detail sectional view of the sight tube and associated devices;

Fig. 6 is an enlarged end view taken on the line 6—6 of Fig. 5;

Fig. 7 is an enlarged section taken on the line 7—7 of Fig. 5;

Fig. 8 is an enlarged section taken on the line 8—8 of Fig. 1;

Fig. 9 is an enlarged section taken on the line 9—9 of Fig. 1;

Fig. 10 is a diagrammatic view showing the method of training the sight tube on the north celestial pole by means of the North Star;

Fig. 11 is an enlarged perspective view of the end of the sight tube showing the North Star in alinement with the sights; and Fig. 12 is an enlarged section taken on the line 12—12 of Fig. 1.

Similar numerals refer to similar parts throughout the several figures.

Referring more particularly to Fig. 1, the sight tube 13 which constitutes the main or polar axis of my improved instrument is rigidly secured by rivets 14 to the upper end of the leg 15 of a tripod of special design (Fig. 5). This leg 15 is triangular in cross-section (Fig. 12), while the other legs 16 and 17 of the tripod are pivoted to the upper end of the leg 15 by the screw-pins 18 (only one being shown in Fig. 1). Such tripod arrangement permits the three legs 15, 16 and 17 to lie alongside one another when the tripod is closed, while forming a triangular support for the instrument when opened and set in operative position.

The tube 13 is provided with a pair of sights consisting of the triangularly pointed sight 19 set within the tube 13 itself (Fig. 5) and the adjustable circular opening 20 at the lower end of the tube 13. These sights 19 and 20 are designed to enable the observer to aim the axis of the tube 13 at the true north celestial pole, for example, by training the sights 19 and 20 upon the North Star as shown in Figs. 10 and 11, this being done before the view through tube 13 has been obstructed by inserting therein the removable mechanism hereinafter described. As shown more particularly in Figs. 5 and 6, the point of the inner sight 19 lies in the axis of the tube 13 while the sight 20 consists of a circular opening formed in the round cap 21 that is manually rotated and adjusted on the lower end of the tube 13.

Riveted to the cap 21 is the disk 22 that fits snugly within the curled ends 23 of the tube 13 to guide and hold in position the cap 21, such curled ends 23 engaging the rim of the disk 22 as shown in Fig. 5. The sight 20 is cut eccentrically in the cap 21 (Fig. 11) in such adjusted relation with the tube 13 that a line connecting the center of the sight 20 and the point of the sight 19 makes with the axis of the tube 13 an angle that is equal to the angular distance of the North Star from the true north celestial pole.

By this mechanism in which the cap 21 is rotated into proper position (Figs. 6 and 11), the axis of the tube 13 may be directed on the north celestial pole by aiming the line of the sights 19 and 20 at the North Star.

The head of the rivet 24 on the cap 21 is so affixed as to constitute a marker to enable the cap 21 to be correctly positioned on the tube 13. Such cap position may be accurately determined by noting the relation of this marker 24 on the cap 21 to the background of the sky. In the diagrammatic showing of Fig. 10, the marker 24 is so disposed that by aiming the tube 13 in the general direction of the North Star the cap 21 is rotated so that the marker 24 is placed at the edge of the cap toward the two pointer stars of the Great Dipper (Ursa Major) as they appear in the background of the sky; when the legs 15, 16 and 17 of the tripod have been so adjusted relatively to each other as to bring the line of the sights 19 and 20 upon the North Star (Fig. 11), the observer will then have the axis of the tube 13 directed upon the true north celestial pole.

By similar manipulations and adjustments my improved instrument may be set to point to the true south celestial pole to meet the requirements in using same for observations in the southern hemisphere.

My instrument also embodies for use a circular star map 25 removably arranged about the tube 13 upon the frictional bearing 26 which is sleeved on the tube 13 (Figs. 1 and 5) to rotate at right angles to the axis of the tube 13, and this bearing 26 may be lifted off the upper end of the tube 13. The bearing 26 passes upwardly through a hole in the center of the map 25 and this map 25 is permanently affixed to the bearing 26.

Mounted removably on the upper end of the upper open end of the tube 13 is the tubular column 27 which is detachably fitted within the tube 13 and supports the sighting and indicating mechanism as shown in Fig. 5. A longitudinal slit or opening is formed in the upper end of the tubular column 27 to hold the rotary disk 28 mounted on the cross-pin 29 (Fig. 1). The disk 28 is guided by two segmental strips 30, preferably of wood, which fill the space between the disk 28 and the walls of the column 27 (Fig. 3). The disk 28 carries two star sights 31 and 32 (Figs. 1 and 8), which may be aimed at any desired celestial object by rotating the column 27 in the tube 13 to give the required right ascension, and then by rotating the disk 28 on the pin 29 to give the required declination. Telescopic sights may be used on the sights 31 and 32 if desired.

The indicator 33 comprises the slidable bar that moves transversely through slots in the tubular column 27 (Figs. 3 and 5), and terminates in the pointer 34 bent downwardly from the bar 33 to register with, and designate, any position on the star map 25. Motion of the disk 28 on its axis on the pin 29 is transmitted to the indicator 33 by two belts 35 and 36, preferably formed of spring metal, which are secured to the disk 28 adjacent the star sights 31 and 32 as shown in Fig. 1. These belts 35 and 36 pass snugly around the periphery of the disk 28 and are then guided through the column 27 by metallic strips 37 and 38 and thereafter extend oppositely along the top surface of the indicator 33 with their lower ends fastened to the ends of the indicator 33 as shown in Fig. 1. These belts 35 and 36 are so adjusted relatively to each other and to the indicator 33 that when the star sights 31 and 32 are brought parallel to the axis of the tube 13 and are thereby aimed at the true north celestial pole, the pointer 34 of the indicator 33 will be brought to its inmost position adjacent the foot of the column 27.

The star map 25 is so plotted that the north celestial pole is developed into a small circle through which the column 27 may pass (Fig. 2). The distances measured outwardly and radially from this small circle are proportional to the angular distances of the celestial objects represented from the north celestial pole, while the angular measurements about the center of the map 25 measured from a given radius are proportional to the right ascension of such celestial objects.

Surrounding the marginal rim of the map 25 (Fig. 2) are divisions indicating the months and days of the year so that by rotating the map 25 about the tube 13 into the position where the current date is directly upward at its highest point, an approximately correct position is secured for observation in the early evening. Exact adjustments may be made, however, by aiming the star sights 31 and 32 at any star which the observer recognizes, for example, one of the pointers of the Great Dipper (Ursa Major), and then rotating the map 25 as required to bring that star as shown on such map directly beneath the pointer 34 of the indicator 33.

By this means the instrument as a whole is brought into correct adjustment for observations at that particular time and place, and when the star sights 31 and 32 are aimed at any celestial object in which the observer is interested, the pointer 34 of the indicator 33 will automatically register with, and designate, such object on the map 25. In like manner the operation of my instrument may be reversed, and various celestial objects shown on the map 25 may be found in the sky by manipulating the disk 28 to cause the indicator pointer 34 to rest upon the object as marked on the map 25 whereupon the observer may find the desired object in the sky along the line of the star sights 31 and 32.

In Fig. 2 I have shown the map 39 which indicates the predicted position at various predetermined dates of certain planets 40, comets, or other moving celestial objects. Such map 39 is plotted in the same manner as map 25 of the fixed stars, and may be printed for a circular sheet superposed on the star map 25 and may be keyed in correct position by a radial mark on its rim. As shown in Fig. 2 the map 39 is transparent to show the star map 25 beneath; the requisite data on both maps 25 and 39 may be combined in a single map if desired. The maps are illuminated by a lamp 40a secured to the column 27 by the clamp 41 fastened to the column 27 as shown in Figs. 1 and 9 to enable the observer to follow the pointer 34 as the latter is swung about the axis of the instrument.

Referring to Figs. 10 and 11, the North Star is indicated at 42, while the pointers of the Great Dipper (Ursa Major) are marked 43 and 44.

In assembling the instrument for use, the tripod is first set up so that the axis of tube 13 is aimed at the celestial pole by the use of sights 19 and 20 in the manner described. The circular star map 25, mounted on the bearing 26, is then slipped over the outer end of the tube 13 and put into approximate adjustment by revolving it to bring the present date directly at the top. The sighting and indicating mechanism carried by the tubular column 27 is then placed in position by passing the lower end of column 27 through the hole in the center of the map and telescoping it within the upper end of tube 13. The map is then brought into exact adjustment, as hereinabove explained, by means of an observation on some star which the observer recognizes. This completes the adjustment of the instrument for time and place.

The operation of my improved astronomical instrument has been hereinbefore described. Such instrument embodies in itself the disk 28 carrying the star sights 31 and 32 mounted on the column 27 in a position sufficiently remote from the map 25 to avoid interference with the head of the observer or obstructing his line of sight, thereby obviating the necessity of mounting the star sights 31 and 32 on extended arms. Furthermore the transmission of motion from the star sights 31 and 32 to the indicator 33 is attained by the flexible belts 35 and 36 (or strings) constrained by the guides 37 and 38 in the column 27 so that when the disk 28 is rotated in one direction, the pointer 34 is pulled by one of the belts, and when the disk 28 is rotated in the reverse direction, the pointer 34 is pulled oppositely by the other belt. Again motion is transmitted from the disk 28 to the pointer 34 in such direction that the latter moves inwardly toward the center of the map 25 as the sights 31 and 32 are rotated toward the celestial pole that lies above the map.

Further novel features in my instrument comprise the transmission of motion from the disk 28 to pointer 34 so that the latter is just outside the column 27 when the sights 31 and 32 are trained on the celestial pole above the map 25 whereby a scheme of map development is attained in which that pole is represented by a circle sufficiently large to accommodate the column 27 with the polar distances measured radially and outwardly from that circle; also novel means for setting the axis of the instrument by sighting on one or more stars thereby avoiding the use of a magnetic compass and plumb bob, and also making the observer independent of knowledge of latitude and magnetic declination, and in particular setting the axis of the instrument by sighting upon the North Star with means for setting the axis of the instrument by adjusting the legs of the tripod upon which it is mounted; also novel means for setting such axis by providing a line of sight forming with this axis an angle equal to the polar distance of the particular star by which such axis is designed to be set, coupled with means for rotating such line sight 31 and 32 while maintaining this angle with such axis, and a marker 24 for determining the correct position of rotation of such line of sight by reference to known celestial objects.

Furthermore I have embodied in this instrument means for setting its axis upon the celestial pole by shifting the legs of the supporting tripod, one leg of which rigidly carries the tube 13, such leg 15 being substantially triangular in cross-section, the other two legs 16 and 17 being pivoted to two of the sides of the leg 15 in such a manner that the legs 16 and 17 may be opened in the form of a tripod or closed to lie together in a substantially straight line; again the associated parts comprising this instrument may be readily assembled and disassembled in that the map 25 with bearing 26 at the center readily slips over the tube 13, and the sighting and indicating devices on the column 27 have bearings to slip into the interior of the tube 13, together with the adjustable lamp 40a that follows the rotation of the indicator 33 as the latter is swung on its axis.

I have also provided a map on which the predicted positions of the sun, moon, planets, comets and other celestial objects not included among the fixed stars may be plotted for predetermined dates according to the scheme of map development hereinbefore described.

Various changes or alterations may be made in the specific constructions shown without departing from the invention or sacrificing the advantages derived from its use, provided such changes or alterations fall within the scope of the appended claims.

I claim as my invention:—

1. An astronomical instrument comprising a sight tube mounted on an adjustable support, and a pair of sights carried by said tube, one of said sights being rotatably adjustable relatively to the axis of the tube to train such axis upon a fixed celestial point.

2. An astronomical instrument comprising a sight tube mounted on an adjustable support, and a pair of sights carried by said tube, one of said sights being rotatably adjustable relatively to the axis of the tube to train such axis upon a fixed celestial point, the other sight lying in the axis of the tube.

3. An astronomical instrument comprising a sight tube mounted on an adjustable support, and a pair of sights carried by said tube, one of said sights being manually rotatable on the observer's end of the tube to be adjusted relatively to the axis of the tube to train such axis upon a fixed celestial point.

4. An astronomical instrument comprising a sight tube mounted on an adjustable support, an inner sight fixed in the axis of the tube, and an outer sight comprising a hole eccentrically cut in a member rotatably mounted on the outer end of the tube to allow the axis of the tube to be trained upon a fixed celestial point.

5. An astronomical instrument comprising a sight tube mounted on an adjustable support, an inner sight fixed in the axis of the tube, an outer sight comprising a hole eccentrically cut in a member rotatably mounted on the outer end of the tube to allow the axis of the tube to be trained upon a fixed celestial point, and means on said member to position said outer sight relatively to a celestial object.

6. An astronomical instrument comprising a sight tube mounted on an adjustable support, a circular star map rotatable about the axis of the sight tube, a tubular column removably mounted on and in co-axial alinement with the sight tube, a rotary member carrying star sights on said column, a pointer carried by said column and radially and laterally movable over the map, and means connecting the pointer and rotary star sight member to secure relative movements therebetween in either direction.

7. In an astronomical instrument, a rotary member carrying star sights, a subjacent circular star map, a pointer movable radially and laterally over said map, and means connecting said rotary member and pointer whereby the latter will move toward the center of the map when the star sights are moved toward the celestial pole.

8. In an astronomical instrument, a rotary member carrying star sights, a circular star map rotatable about a support extending perpendicularly therethrough, a pointer carried by said support and movable radially and laterally over said map, and means connecting said rotary member and pointer to allow the pointer to lie adjacent said support when the star sights are trained at the celestial pole.

9. In an astronomical instrument, a circular star map movable on its transverse axis, a superposed pointer movable radially and laterally over the map, a rotary disk mounted on a support co-axial with said map axis, and a pair of flexible members connecting said disk and pointer to transmit motion between the disk and pointer in either direction.

10. In an astronomical instrument, a circular star map movable on its transverse axis, a superposed pointer movable radially and laterally over the map, a rotary disk mounted on a support co-axial with said map axis, and a pair of flexible metallic belts connecting said disk and pointer to transmit motion between the disk and pointer in either direction.

11. In an astronomical instrument, a circular star map movable on its transverse axis, a superposed pointer movable radially and laterally over the map, a rotary disk carrying star sights and mounted on a support co-axial with said map axis, and a pair of flexible members connecting said disk and pointer to transmit motion between the disk and pointer in either direction.

12. In an astronomical instrument, a circular star map movable on its transverse axis, a superposed pointer movable radially and laterally over the map, a rotary disk carrying star sights mounted on a support co-axial with said map axis, and a pair of flexible belts attached to said disk adjacent the star sights with their opposite ends attached to the extremities of said pointer.

13. In an astronomical instrument, a sight tube mounted on an adjustable support and adapted to be sighted upon the North Star, and means for adjusting the sights in said tube trained on the North Star to enable the axis of the tube to be directed upon the true north celestial pole.

14. In an astronomical instrument, a sight tube carrying a line of adjustable sights to be trained on a fixed celestial object, and means for rotating said sights about the axis of the tube to enable the observer to train the axis of the tube upon a celestial pole.

15. In an astronomical instrument, a sight tube carrying a line of adjustable sights to be trained on a fixed celestial object, means for rotating said sights about the axis of the tube to enable the observer to train the axis of the tube upon a celestial pole, and means for determining the correct position of said rotation of the line of sights by a fixed celestial object.

16. In an astronomical instrument, a sight tube mounted rigidly upon a tripod leg substantially triangular in cross-section, and a pair of tripod legs pivoted to said triangular leg to enable the sight tube to be trained in a predetermined direction by adjustment of said tripod legs.

17. In an astronomical instrument, a rotatable star map, a rotary member spaced apart from said map and carrying star sights, a pointer carried by a column co-axial with said map, said pointer being radially and laterally movable over the map, and means operatively connecting the pointer and rotary star sight member to secure relative movements therebetween towards or from said column.

18. In an astronomical instrument, a rotary member carrying star sights, a map indicating positions of planets on various dates, a pointer movable radially and laterally over said map, and means connecting said rotary member and pointer to secure relative movements therebetween in either direction.

19. In an astronomical instrument, a circular star map, means for directing the transverse axis of said map at a celestial pole by sighting upon stars in the sky, a column co-axial with said axis of the map and rotatable about said axis, a rotary member carrying star sights supported by said column, a pointer radially and laterally movable over said map and supported by said column, and means connecting the rotary member and pointer to secure relative movements therebetween in either direction.

ALBERT E. LOBECK.